US007900200B1

(12) United States Patent (10) Patent No.: US 7,900,200 B1
Violleau et al. (45) Date of Patent: Mar. 1, 2011

(54) PERSISTENCE SYSTEM FOR SERVLET-BASED APPLICATIONS ON RESOURCE-CONSTRAINED DEVICES

(75) Inventors: Thierry Violleau, Poissy (FR); Tanjore S. Ravishankar, San Jose, CA (US); Sebastian Jürgen Hans, Berlin (DE); Matthew R. Hill, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1293 days.

(21) Appl. No.: 11/454,483

(22) Filed: Jun. 16, 2006

(51) Int. Cl.
*G06F 9/44* (2006.01)
(52) U.S. Cl. .................................................. 717/167
(58) Field of Classification Search .................. 717/124, 717/139, 168, 165–167; 719/315–316; 709/223, 709/229; 713/155, 176, 182, 168, 185; 705/41; 726/8, 13; 235/379–380, 492
See application file for complete search history.

(56) References Cited

U.S. PATENT DOCUMENTS 7,716,492 B1 * 5/2010 Saulpaugh et al. .......... 713/185

OTHER PUBLICATIONS

Oestreicher et al, Usenix: "Object Lifetimes in Java Card", Usenix Workshop on Smartcard Technology, May 1999, pp. 1-9.*
James Goodwill, "Tutorial: Servlets && Tomcat", Programming on the Web (CSC309F), May 13, 2006, pp. 1-6,—see URL: <http://web.archive.org/web/20060513140416/http://www.cs.toronto.edu/~wael/teaching/309/tutorials/tutorial10.pdf>.*
Gregory Bussard, "Next Generation Java Card Framework", Gemphus Developer Conference 2002,p. 1-5.*

* cited by examiner

*Primary Examiner* — Tuan Anh Vu
(74) *Attorney, Agent, or Firm* — Gunnison, McKay & Hodgson, L.L.P.; Forrest Gunnison (57) ABSTRACT

A persistence management system facilitates porting servlet-based applications, such as Web applications, to an extremely mobile/nomadic system such as a resource-constrained device platform, e.g., a smart card, where sessions on a card acceptance device are intermittent by nature. Persistence management system (i) minimizes the startup time, and (ii) restores applications in a consistent state. The persistent management system supports: a) selective persistence of servlet model objects: both container-managed objects and application-managed objects; b) optional persistence of threads; and c) optional persistence of connection objects.

19 Claims, 9 Drawing Sheets

PERSISTENCE SYSTEM FOR SERVLET-BASED APPLICATIONS ON RESOURCE-CONSTRAINED DEVICES

BACKGROUND OF THE INVENTION

1. Field of the Invention

The present invention relates generally to resource-constrained devices such as smart cards, and more particularly to implementing servlet-based applications on resource-constrained devices.

2. Description of Related Art

Java Card™ technology enables programs written in the Java™ programming language and utilizing applets to be run on smart cards and other small, resource-constrained devices. (Java Card™ and Java™ are trademarks of Sun Microsystems, Inc. of Santa Clara, Calif.) Developers can build and test programs using standard software development tools and environments, then convert the programs into a form that can be installed onto a Java Card™ technology-enabled device. Java Card™ implementations support persistence of applet data across sessions where a session extends from insertion of the resource-constrained device into a card acceptance device (CAD) until removal of the resource-constrained device from the CAD.

Herein, the applet data is for applet applications, i.e., applications servicing requests over the ISO7816 APDU protocol. Applet applications include at least one applet.

While persistent memory is typically implemented with EEPROM (Electrical Erasable Programmable Read-Only Memory) and volatile/non-persistent memory is implemented with RAM (Random Access Memory), transient (that is non-persistent) objects may still be allocated in EEPROM when there is shortage of RAM memory. Typically, the amount of RAM, even on a high-end resource-constrained device, is small, e.g., 16 to 32 Kbytes.

Java Card™ implementations also support isolation of application execution contexts. Isolation means that a Java Card™ application cannot access data or code of an application in another context unless the other application explicitly provides an interface for access. Context isolation is enforced by Java Card™ firewalls. Applications can provide interfaces for other applications to access in the form of Shareable Interface Objects, which allow secure access across the application firewalls.

Application software for the Java Card™ platform was limited to implementing the Java Card™ applet application model. Typically, the Java™ Servlet-based application model, used on server machines, has not been implemented directly on resource-constrained device, such as smart cards, because as explained more completely below, resource-constrained devices do not include the resources found on server machines.

A servlet is a Java™ technology-based Web component managed by a container. Servlets are Java™ classes that are run by a Java™ technology-enabled Web server. A servlet container contains and manages servlets through their lifecycle. Servlets interact with Web clients via a request/response paradigm implemented by the servlet container. While not limited to it, a servlet container typically supports HTTP and HTTPS (HTTP over SSL or TLS) as a protocol for requests and responses. A servlet container may provide additional services to the applications being run by the servlet container.

Web applications are collections of servlets and other components and resources bundled along with a deployment descriptor to be deployed into a servlet container. The application deployment descriptor conveys the elements and configuration information of an application between the different actors during the application lifecycle, namely: application developers, application assemblers, and deployers or in the context of Java Card™ technology, smart-card issuers. To any Web application corresponds a context named a servlet context. A servlet context defines a servlet's view of the Web application within which the servlet is running.

The Hypertext Transfer Protocol (HTTP) is by design a stateless protocol. To build effective Web applications, it is imperative that requests from a particular client be associated with each other in what is called a session. Session tracking can be performed in a servlet-based application via instances of interface HttpSession.

Unfortunately, a smart card or other resource-constrained device does not include a disk drive, or large amounts of random access memory. Consequently, the servlet model that depends on secondary storage on disk drives and large amounts of memory on a server cannot be implemented directly in a smart card.

Servlet-based applications were originally intended to run on server machines, which are intended to be always on and which benefit from reliability, availability, and serviceability features so that downtime is avoided or limited. Unlike these server machines, when a new CAD session starts—that is the resource-constrained device has been inserted in a CAD—the platform is reset and the volatile memory is cleared. Thus, the content of the volatile memory is lost across CAD sessions. Only the persistent memory content is retained across CAD sessions.

The servlet model, which was originally designed for server-side applications, does not account for an environment where the system can be brought down at any time. Re-initializing the servlet-based applications upon each platform reset would induce a performance penalty, which is not compatible with smart card use. On the other hand, indiscriminately persisting all objects of a servlet-based application is not desirable since such persistence may imply additional cleanup to resume from a clean state. Moreover, storing session data in persistent memory may have a performance impact during application operations depending on the frequency of updates. Unfortunately, these factors inhibit the utilization of the servlet model to implement web-based applications on a resource-constrained device.

SUMMARY OF THE INVENTION

In one embodiment, a persistent management system on a resource-constrained device ensures the persistence across card acceptance device sessions (card insertions in and tears from the card acceptance device) of the state of a servlet-based application deployed on the resource-constrained device in accordance with the lifecycle of such application. The startup time (including the restoration in a consistent state) of a servlet-based application is greatly accelerated. Additionally, developers of servlet-based applications do not have to handle thread persistence in any particular card-specific way (when compared to regular server-hosted servlet-based applications). Without thread persistence, a developer would have to explicitly handle platform reset (restart of an application) and would have to recreate and restart threads.

In one embodiment, upon starting execution of an application on a resource-constrained device, a logical persistence root object is created for all objects associated with the application. The objects are instantiations of at least one object-orientated class. The persistent management system stores each object of the objects reachable from the logical persistence root in a persistent memory in the resource-constrained device. Each object stored in the persistent memory is persistent across sessions until the application is unloaded. A session is started on insertion of the resource-constrained device in a card acceptance device and the session is terminated upon removal of the resource-constrained device from the card acceptance device.

In one embodiment, the logical persistence root comprises a servlet-context and the application is a servlet-based application. The objects stored in the persistent memory include any one of or any combination of a filter, an event listener, and a load-on-start-up servlet.

The method also includes storing a second object, referenced from a first object stored in the persistent memory, in the persistent memory. The first object is reachable from the logical persistence root. Thus, the second object is indirectly referenced from the logical root of persistence.

The method stores objects not reachable from the logical persistent root in a non-persistent memory in the resource-constrained device. The non-persistent memory is reset upon the start of the session.

To further enhance the performance of the application on the resource-constrained device an object is used from a pool of objects. The pool of objects can be implemented in either the non-persistent memory, or the persistent memory. To avoid leaks of data, in one embodiment, the use of the pool of objects is limited to servlets of a same application.

To permit servlets in the application to spawn threads, while minimizing the work required of the developer in restarting the threads when a session is stopped and restarted, the method also includes automatically restarting a thread upon start of another session different from the session.

Hence, in one embodiment, a resource-constrained device includes a persistent memory having stored therein a logical root of persistence; a non-persistent memory; and a persistent management system. The persistent management system moves an object from the non-persistent memory to the persistent memory when the object is referenced either directly or indirectly from the logical root of persistence. Also, a pool of objects is stored in either or both of the non-persistent memory and the persistent memory.

The resource-constrained device also includes a facility for automatically restarting a thread upon start of a new session for the resource-constrained device. A new session is started on insertion of the resource-constrained device in a card acceptance device and the new session is terminated upon removal of the resource-constrained device from the card acceptance device A computer product having embedded therein computer-readable instructions for a persistence management system wherein upon execution of the computer-readable instructions on a resource-constrained device generates a method comprising:

creating a logical persistence root for objects associated with an application being started for execution on the resource-constrained device wherein the objects are instantiations of at least one object-oriented class; and storing each object of the objects reachable from the logical persistence root in a persistent memory in the resource-constrained device wherein each object stored in the persistent memory is persistent across sessions until the application is unloaded and further wherein a session is started on insertion of the resource-constrained device in a card acceptance device and the session is terminated upon removal of the resource-constrained device from the card acceptance device.

BRIEF DESCRIPTION OF THE DRAWINGS

In the drawings and the following detailed description, elements with the same reference numeral are the same or equivalents elements. Also, the first digit of the reference numeral indicates the figure in which the corresponding element first appears.

GLOSSARY OF TERMS

As used in the following detailed description, an interface is a named collection of method definitions and defines a protocol of behavior that can be implemented by any class in the class hierarchy. An interface defines a set of methods but does not implement them.

As used in the following detailed description, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described herein.

As used in the following detailed description, resource-constrained devices include devices having limited resources and/or limited resource capacity. Resources include processors and memory. One example of a resource-constrained device is a smart card, sometimes referred to as a card, having limited processing capacity and limited memory resources. One example of a smart card is a secure portable device such as a Java Card™ technology-enabled device, or the like. Java Card™ technology is described in Chen, Z., Java Card™ Technology for Smart Cards—Architecture and Programmer's Guide, Boston, Addison-Wesley, 2000.

As used in the following detailed description, remote devices are computer devices and other devices with a processor and memory, other than the particular resource-constrained device, capable of direct and/or indirect interaction with the resource-constrained device.

As used in the following detailed description, a resource-constrained device may support a multi-application environment, i.e., multiple applications coexist on the resource-constrained device. One example of a multi-application environment is a Java Card™ Runtime Environment (JCRE). The JCRE is a computing environment, or platform, from Sun Microsystems that can run applications developed using the Java™ programming language and sets of development tools. The JCRE includes one or more JCRE contexts.

As used in the following detailed description, a JCRE context is a system context that manages card resources—processor, memory, I/O interfaces and other system resources. Application containers execute in a JCRE context.

As used in the following detailed description, a container manages application contexts and application lifecycle.

As used in the following detailed description, an application context includes one or more executing applications.

As used in the following detailed description, an application includes, for example, web applications, e.g., applications servicing requests over the HTTP protocol.

As used in the following detailed description, a servlet is a program that when executed generates dynamic content and interacts with off-card web clients using a request-response paradigm. Servlets can also interact with other on-card applications. Servlets execute on a computer device such as a resource-constrained device.

As used in the following detailed description, an applet is a program that when executed interacts with off-card APDU clients using a request-response paradigm. Applets can also interact with other on-card applications executing on a computer device such as a resource-constrained device.

As used in the following detailed description, an object is an instantiation of an object-oriented computer program language entity, such as a class.

As used in the following detailed description, a card acceptance device is any device or connection for interfacing a resource-constrained device with another device. Examples of card acceptance devices include, but are not limited to: devices in the prior art referred to as card acceptance device; a USB interface that directly connects the resource-constrained device to the terminal (phone or desktop); contactless readers called proximity coupling devices (PCD), which use a RF interface to connect to a resource-constrained device; and other interfaces such as MMC (multi-media card) and NFC (near field communication) for connecting a resource-constrained device to another device.

DETAILED DESCRIPTION

Figure 1:
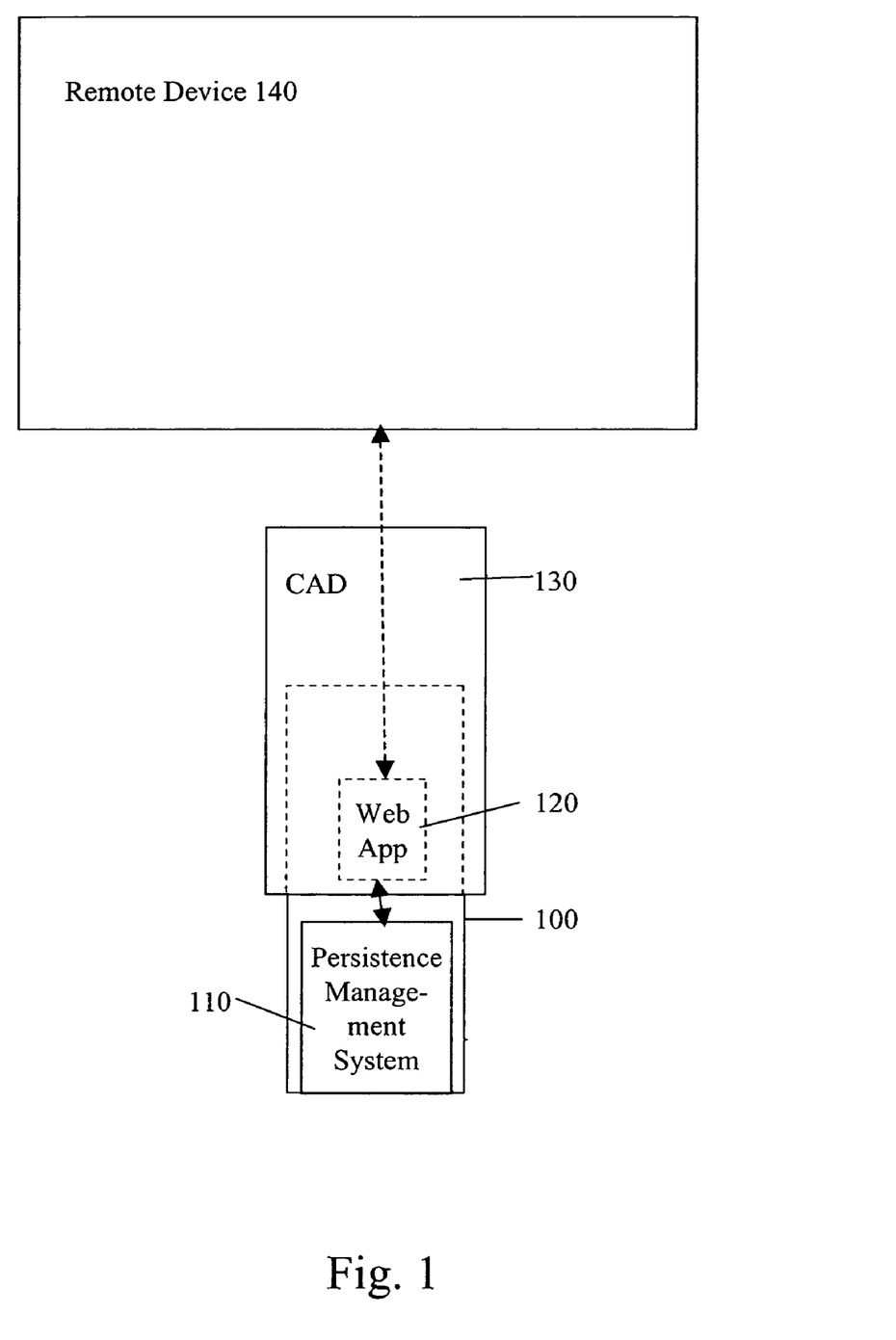
FIG. 1 is a high-level block diagram of a resource-constrained device that includes a persistent management system according to one embodiment of the present invention.

Despite the restraints imposed by a resource-constrained device 100, in one embodiment, a persistence management system 110 facilitates porting servlet-based applications, such as Web application 120, to an extremely mobile/nomadic system such as a resource-constrained device platform 100, e.g., a smart card, where sessions on card acceptance device (CAD) 130 are intermittent by nature. Persistence management system 110 overcomes the problems of serviceability imposed by the frequent starting and stopping of CAD sessions, sometimes called sessions, while (i) minimizing the startup time, and (ii) restoring applications in a consistent state. Additionally, persistence management system 110 makes this as transparent as possible to the developers of servlet-based applications and maintains a consistent programming experience across platforms (enterprise application servers and smart cards).

In one embodiment of this invention, servlet-based applications are implemented on resource-constrained device 100, and appear to both the programmer and the user to function in a matter equivalent to prior art based servlet applications on a normal server. Persistence management system 110 for servlet-based applications (e.g., web applications,) installed/deployed on resource-constrained device 100 ensures persistence across CAD sessions (insertions in and tears from a card acceptance device 130), of the state of servlet-based applications deployed on a servlet container embedded on resource-constrained device 100 in accordance with the lifecycle of such applications to optimize serviceability.

As explained more completely below, persistence management system 110 differentiates what needs to be persistent from what needs not be to eliminate unnecessary re-initialization or cleanup and achieve optimal readiness. Additionally, persistence management system 110 alleviates if not eliminates the need for the developer of such a servlet-based application to account in any special way other than the one intended for card insertions in and tears from card acceptance device 130.

In one embodiment, the persistent management system 110 supports:

a) selective persistence of servlet model objects: both container-managed objects and application-managed objects;
b) optional persistence of threads; and
c) optional persistence of connection objects.

Figure 2:
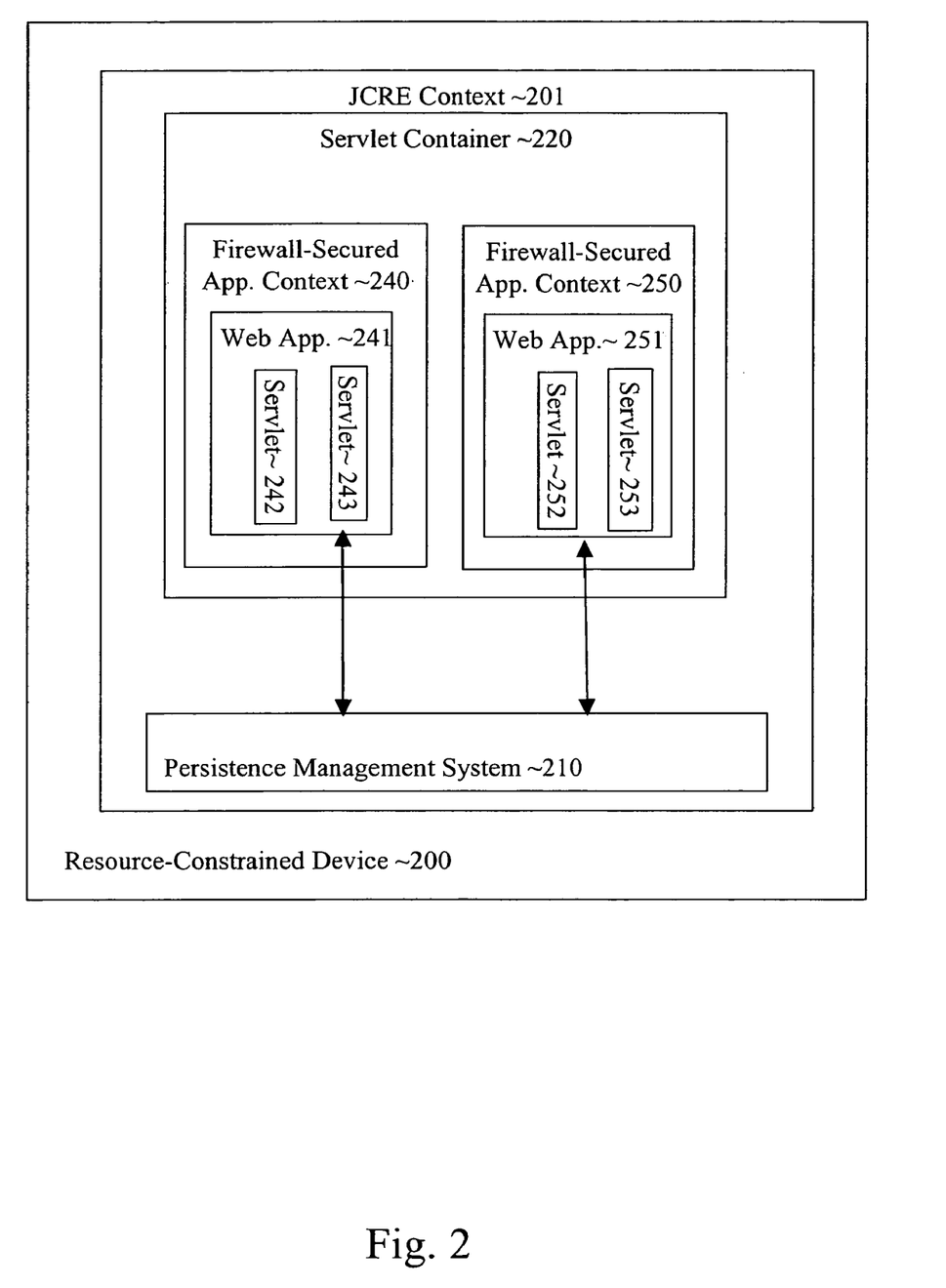
FIG. 2 is a more detailed diagram of one embodiment of the resource-constrained device of FIG. 1 that includes a servlet container, a servlet context, and an application executing in the servlet container.

Prior to considering persistence management system 110 in further detail, one example of an implementation of Web applications on a resource-constrained device that includes an embodiment 210 of persistence management system 110 is considered. In FIG. 2, a multi-application environment Java Card™ Runtime Environment (JCRE) is providing a JCRE context 201, which is a system context that manages one or more containers, e.g., servlet container 220, which are executing on resource-constrained device 200.

Servlet container 220 further includes two web applications 241 and 251 that are each executing in a different firewall-secured application context, i.e., firewall-secured application context 240 and 250, respectively. Web application 241 includes a plurality of servlets, e.g., servlets 242 and 243, while web application 251 also includes a plurality of servlets, e.g., servlets 252 and 253. Firewall-secured application context 240 and 250 are examples of servlet application execution contexts.

JCRE context 201 may also include an inter-application communication service that is executing on resource-constrained device 200 and other services. To avoid detracting from the description of this invention, such services are not considered in further detail.

Isolation of application execution contexts 240 and 250 means that an application, e.g., web application 241, executing in one context cannot access objects of another application executing in another context, e.g., web application 251, unless the other application explicitly provides an interface for access. Isolation is typically enforced via firewalls at the application context level. In this embodiment, firewalls permit access between applications only via controlled interfaces.

In this example, interfaces for access across a firewall include Shareable Interface Objects, which enable bypass of the firewall. Using a sharable interface object, an application in one context can access an object of an application in another context, while maintaining appropriate levels of security.

When executing web application 241, for example, servlet container 220 may create/instantiate container-managed objects—that is: objects created by servlet container 220 as per its operating principles. Web application 241 may create/instantiate application-managed objects—that is: objects created by the application 241, according to its business process.

Container-managed objects include instances of servlets, filters and event listeners provided by the application developer as well as response, request and event objects created when an HTTP request needs to be serviced or when a particular condition needs to be handled. All these objects—container-managed objects and application-managed objects—may be selectively maintained in persistent memory by persistence management system 210.

In one embodiment, objects are maintained in persistent memory 300 (FIG. 3) of resource-constrained device 200 according to the reachability of the objects from their application root objects, which act as logical roots of persistence, sometimes called logical persistence roots. All container-managed objects and all application-managed objects maintained in persistent memory 300 should be reachable from these root objects. In servlet-based applications, servlet context object(s) 311, e.g., one for each of contexts 240 and 250, define the servlets' view of the Web application and ultimately of the container within which the servlets are running. There is only one instance of the servlet context associated with each Web application deployed into a container.

Figure 3:
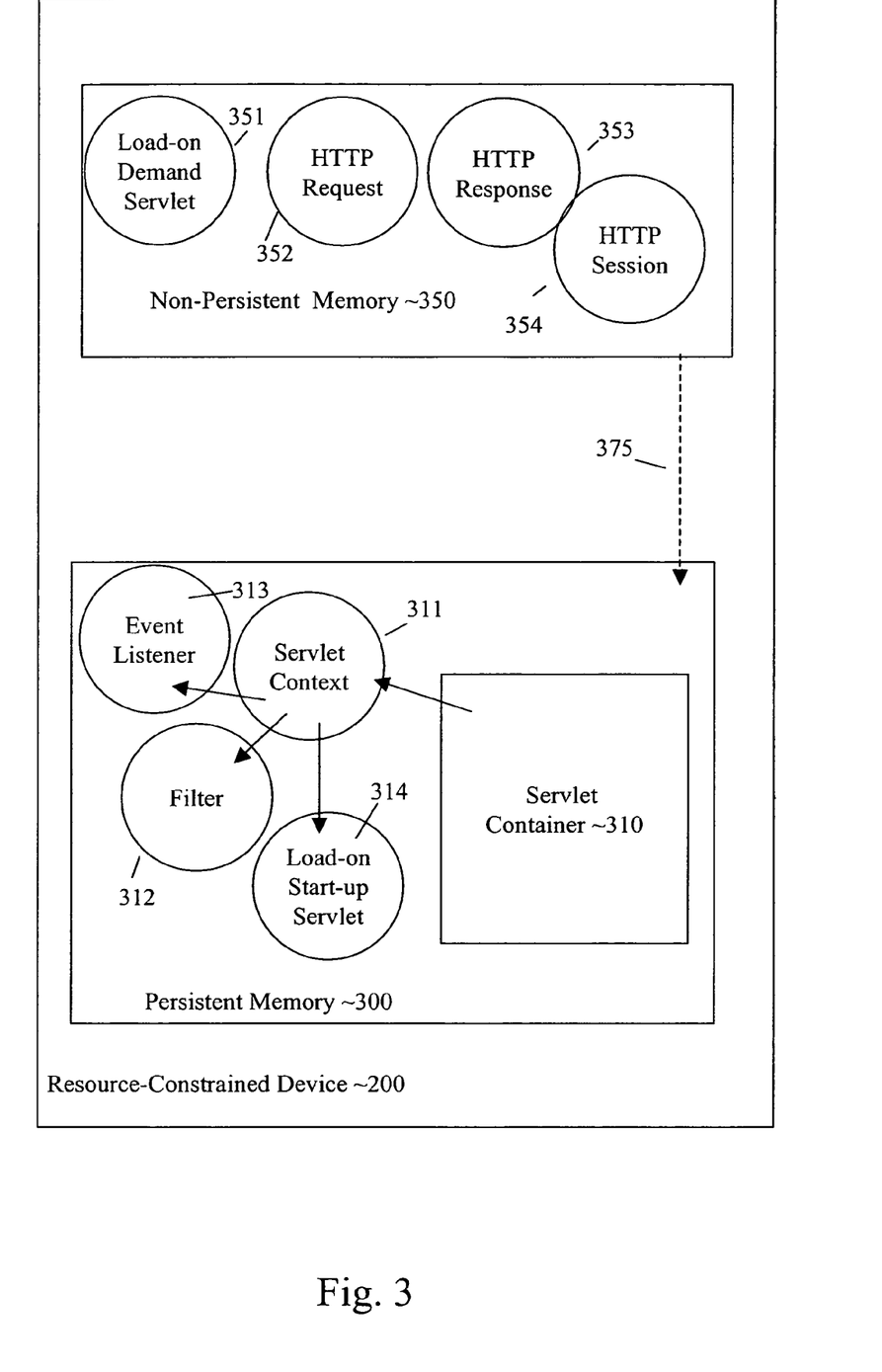
FIG. 3 is a more detailed diagram of one embodiment of the resource-constrained device of FIG. 1 showing various objects and the memories in which the objects are stored during a session.

Therefore, servlet context 311 in this embodiment is designated as a persistence root for application-managed objects and container-managed objects pertaining to the application. Accordingly, in this embodiment, any application-managed objects and any container-managed objects reachable through servlet context 311 are stored in persistent memory 300 of resource-constrained device 200. Servlet container 311 also designates in this embodiment, the web application's configured Event Listener(s) 313, Filter(s) 312 and load-on-startup servlet(s) 314 as persistence root objects. But these persistence root objects are directly or indirectly (via internal fields or helper method access) reachable from the servlet context 311 as shown in FIG. 3. Servlet context 311 is therefore selected as the logical persistent root of the application.

Container-Managed Objects

Container-managed objects are objects created by the container as per its operating principles and pertaining to a particular application such as the servlet context, the filters, the event listeners, the servlets, the sessions and the HTTP requests and responses. After a servlet container 310 is instantiated and stored in persistent memory 300, servlet context 311 is one of the first objects instantiated in persistent memory 300 when an application is being started-up.

Typically, at start-up, any filters 312 associated with servlet container 310 are also instantiated and stored in persistent memory 300. Filters 312 are referenced either directly or indirectly through servlet context 311 and may also be reachable via servlet context 311. As is known to those of skill in the art, a filter or a filter chain is used in preprocessing or postprocessing information to subsequently provide appropriate information to a HTTP request object 352 or to subsequently transform information from a HTTP response object 353, respectively.

Also, typically at start-up, any event listeners 313 associated with the web application being started are instantiated and stored in persistent memory 300. Event listeners 313 are referenced either directly or indirectly through servlet context 311 and may also be reachable via servlet context 311. In addition to the standard event listeners supported by the servlet container to handle HTTP servlet-related conditions, one other embodiment of event listeners suitable for use with this invention is described in copending, commonly assigned, and commonly filed U.S. patent application Ser. No. 11/454,318, entitled "A GENERIC EVENT NOTIFICATION SERVICE FOR RESOURCE-CONSTRAINED DEVICES," of Thierry Violleau, Tanjore S. Ravishankar, Sebastian Hans, and Matthew R. Hill, now U.S. Pat. No. 7,711,783 issued on May 4, 2010, which is incorporated herein by reference in its entirety.

Also, at startup, any load-on-startup servlets 314 are instantiated and stored in persistent memory 300. Load-on-startup servlets 314 also are referenced either directly or indirectly through servlet context 311 and may also be reachable via servlet context 311.

Subsequent to start-up, a container-managed object or application-managed object may be instantiated in non-persistent memory 350. However, if a reference to that object is made from any one of the objects stored in persistent memory 300, that object is moved from non-persistent memory 350 to persistent memory 300. In this embodiment, if objects in non-persistent memory 350 are reachable from an object in persistent memory 300, those objects or object are moved from non-persistent memory 350 to persistent memory 300. In this embodiment, the transfer of objects is always from non-persistent memory 350 to persistent memory 300, as shown by arrow 375, and not in the opposite direction.

Thus, in this embodiment, the following objects are maintained in persistent memory until the servlet-based application associated with the objects is unloaded:

servlet context;
filters;
event listeners; and
load-on-startup servlets.

Note that starting and stopping a CAD session is not unloading the application. When a CAD session is stopped, these objects, in persistent memory, are maintained and available when another CAD session is started. Thus, the behavior seen by the developer and the user is equivalent to behavior on a normal server.

The following objects are—by default—transient:

load-on-demand servlets;
HTTP sessions;
HTTP requests and HTTP responses; and
events.

Load-on-demand servlets 351 are created by container 310 and are only maintained in non-persistent memory 350 at the longest until the CAD session ends. Load-on-demand servlets 351 are created and initialized when there is a request to be serviced. References to load-on-demand servlets 351 may be kept while there are requests to service, or until container 310 decides according to some other policy to destroy them or until the end of the CAD session.

HTTP sessions 354 are created when new client application/card interaction sessions are started and are only maintained in non-persistent memory 350 at the longest until the CAD session ends. References to HTTP sessions 354 are maintained until HTTP sessions 354 time out or until the end of the CAD session.

HTTP request and response objects 352, 353 are created when new requests need to be serviced and are maintained in non-persistent memory 350 while the requests are being serviced or until the end of the CAD session.

Event objects (not shown) are created, in non-persistent memory 350, to encapsulate specific conditions that need to be handled. Event objects are maintained while the events are being handled or until the end of the CAD session.

Figure 4:
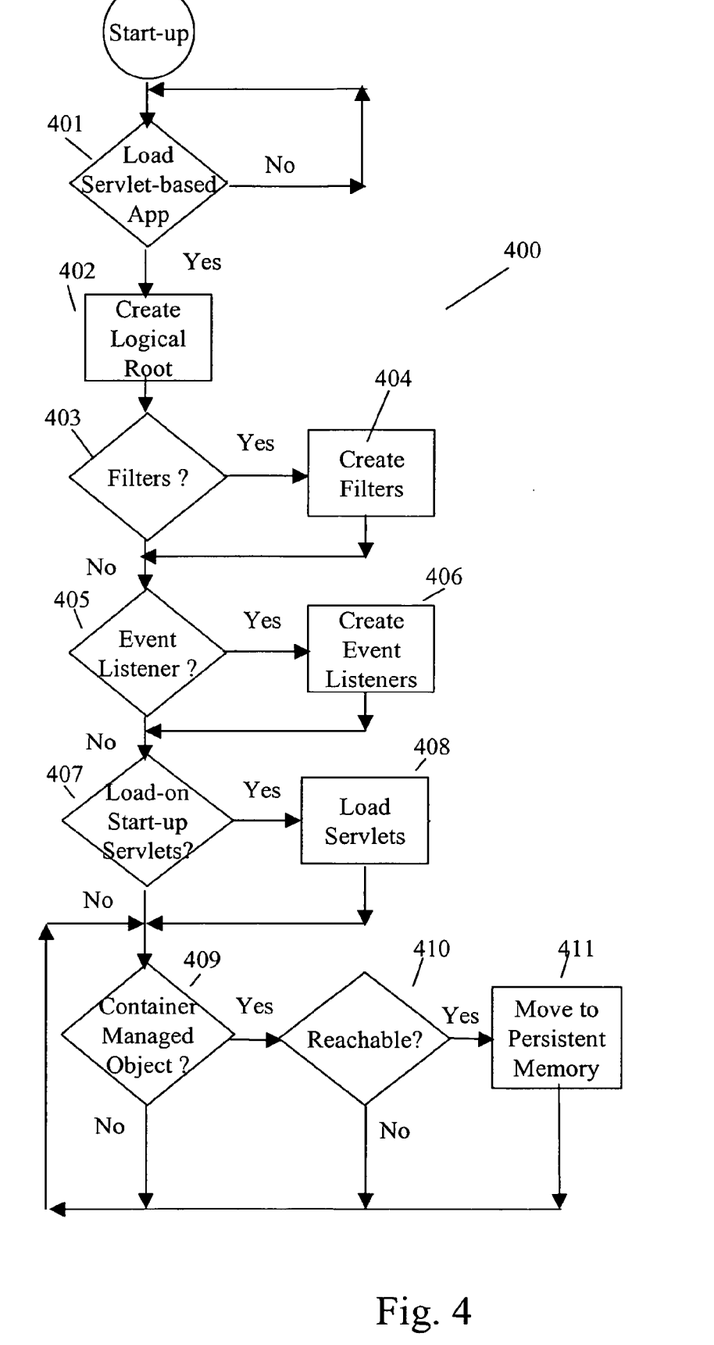
FIG. 4 is a process flow diagram for one embodiment of starting an application and determining which container-managed objects to create in persistent memory and one embodiment of determining, after start-up, whether to move a container-managed object and/or an application-managed object to persistent memory.

FIG. 4 is one embodiment of a process flow diagram 400 for management of container-managed objects by persistence management system 210. Process 400 is initiated on start-up and load of a servlet-based web application. Check operation 401 determines whether a servlet-based application needs to be started. If a start-up of a servlet-based application is not needed, no action is taken. Conversely, if a start-up of the servlet-based application is needed, check operation 401 transfers processing to create logical root operation 402. Check operation 401 should not be interpreted as requiring polling to determine whether to start-up an application. The check operation is simply used to determine whether to perform the subsequent operations in process 400.

In create logical root operation 402, container 310, in persistent memory 300, creates the logical root of persistence object in persistence memory 300. In the embodiment of FIGS. 2 and 3, the logical root of persistence, as explained above, is servlet context 311 for the application being started. Operation 402 transfers processing to filter check operation 403.

Filter check operation 403 determines whether at least one filter needs to be created. If at least one filter needs to be created for the application being started, check operation 403 transfers to create filters operation 404 that in turn creates filters 312, which includes at least one filter, in persistence memory 300. Operation 404, upon completion transfers to event listener check operation 405. If at least one filter is not needed, check operation 403 transfers directly to event listener check operation 405.

Event listener check operation 405 determines whether at least one event listener needs to be created. If at least one event listener needs to be created for the application being started, check operation 405 transfers to create event listeners operation 406 that in turn creates event listeners 313, which includes at least one event listener, in persistence memory 300. Operation 406, upon completion transfers to load-on start-up servlets check operation 407. If at least one event listener is not needed, check operation 405 transfers directly to load-on start-up servlets check operation 407.

Load-on start-up servlets check operation 407 determines whether at least one load-on start-up servlet needs to be created. If at least one load-on start-up servlet needs to be created for the application being started, check operation 407 transfers to create load-on start-up servlets operation 408 that in turn creates load-on start-up servlets 314, which includes at least one load-on start-up servlet, in persistence memory 300. Operation 408, upon completion transfers to container-managed object check operation 409. If at least one load-on start-up servlet is not needed, check operation 407 transfers directly to container-managed object check operation 409.

Container-managed object check operation 409 determines whether a current object being processed in non-persistent memory 350 is a container-managed object, and if the current object is a container-managed object, reachable check operation 410 determines whether the current object is reachable from servlet context 311. If the current object is reachable from servlet context 311, the current object is moved from non-persistent memory 350 to persistent memory 300 in move to persistent memory operation 411. Note that the reachability may be from servlet context 311 to an object that in turn references the object in non-persistent memory 350, and does not have to be directly from servlet context 311.

Herein, when it is stated that an object is created in persistent memory 300, it should not be interpreted as requiring creation of the object directly in persistent memory 300. Rather, it should be interpreted as at the end of the creation process, the object is resident in persistent memory 300. For example, an object could be created in non-persistent memory 350 and then moved to persistent memory 300 in the creation process.

Also, the sequential sequence of operations presented in a process flow diagram are for convenience of explanation and should not be interpreted as limiting the invention to the sequential sequence. In view of this disclosure, one-of-skill-in-the art can implement process 400 in a resource-constrained device based upon the capabilities provided by that platform to provide the desired performance and results.

Application-Managed Objects

All application-managed objects that need to be persistent must be referenced directly or indirectly by servlet context 311, which acts as the logical root of persistence, as described above. These application-managed objects may include not only business objects, helper objects, etc. that the application creates but also any object that is returned from a call to container 310 and which is not by default persistent—such objects could be stub objects returned by container 310 to access a container service such as an event notification service. One embodiment of an event notification service is described in copending, commonly assigned, and commonly filed U.S. patent application Ser. No. 11/454,318, entitled "A GENERIC EVENT NOTIFICATION SERVICE FOR RESOURCE-CONSTRAINED DEVICES," of Thierry Violleau, Tanjore S. Ravishankar, Sebastian Hans, and Matthew R. Hill, now U.S. Pat. No. 7,711,783 issued on May 4, 2010, which was incorporated herein by reference in its entirety previously.

Since the persistence is by reachability, applications objects—to be persistent—cannot only be directly stored in servlet context 311 thru context attribute name/value pairs but also thru any other persistent container-managed object such as in the member fields of a load-on-startup servlet, an event listener or filter. Thus, operations 409 to 411 in process 400 are also applicable to application-managed objects.

Since session objects are not persistent, application-managed objects stored as session attribute name/value pairs are not persistent.

Reified Object References

In some situations, it may be desired to reference an object in non-persistent memory by an object in persistent memory, but it is not desired to move the object in non-persistent memory into persistent memory. For these cases, a reified object reference, sometimes called a transient reference object, is available.

Figure 5A:
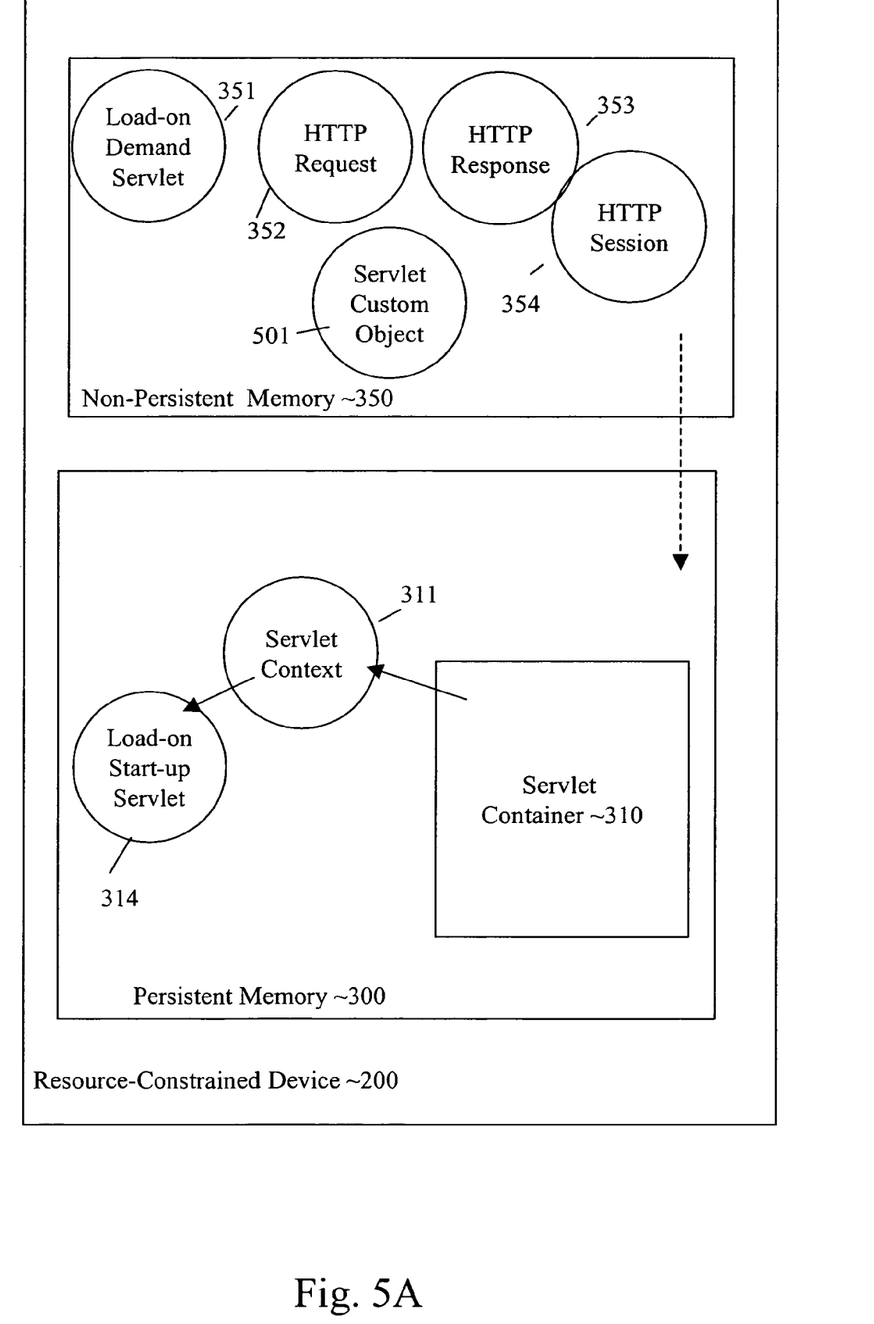
FIGS. 5A to 5C illustrate one embodiment of use of a reified object reference.
Figure 5B:
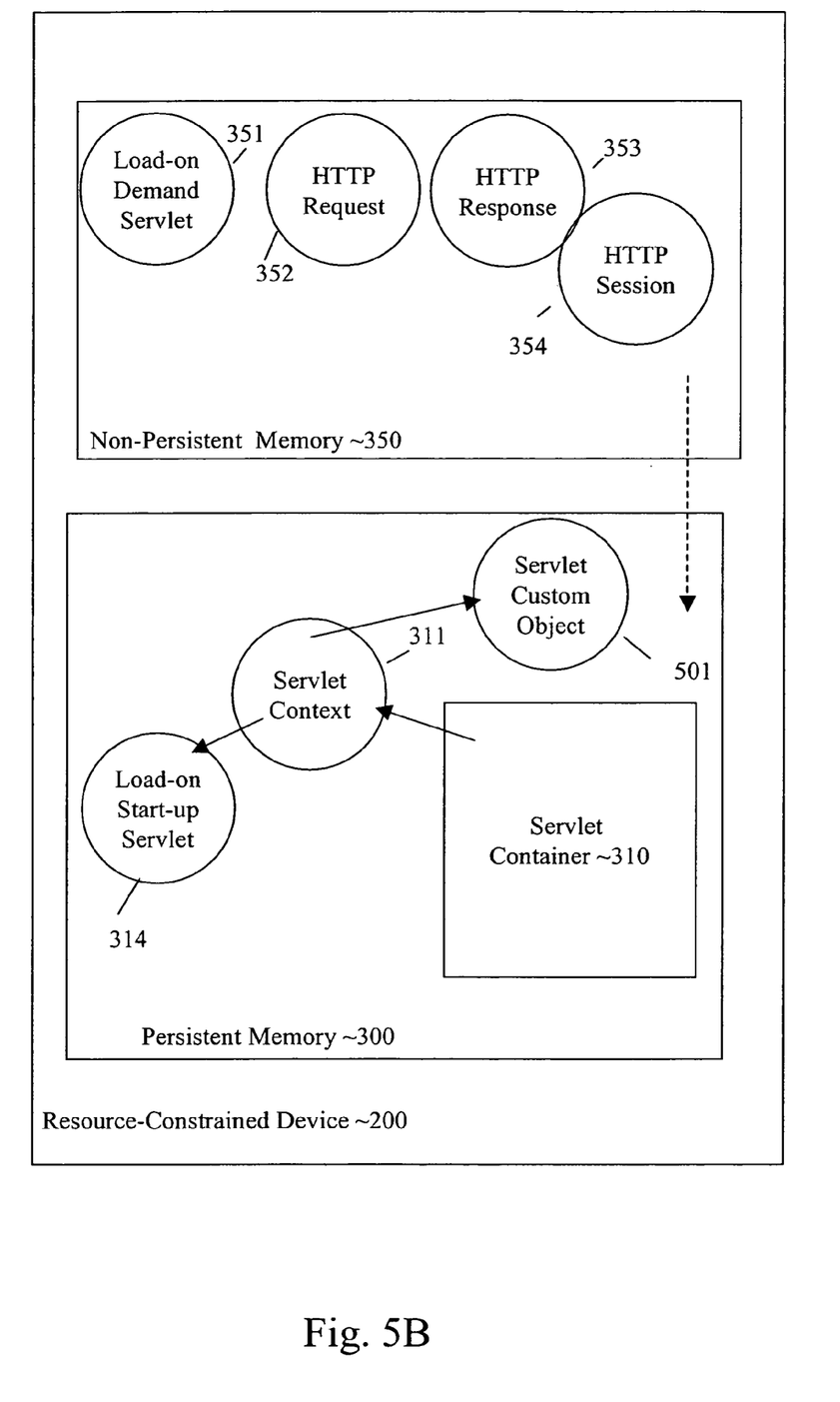

For example, assume that load-on-startup servlet 314 created a servlet custom object 501 (FIG. 5A) in non-persistent memory 350. Next, load-on-start-up servlet 314 stores object 501 in servlet context 311 and so servlet custom object 501 is moved to persistent memory 300 (FIG. 5B) by persistent management system 200.

Figure 5C:
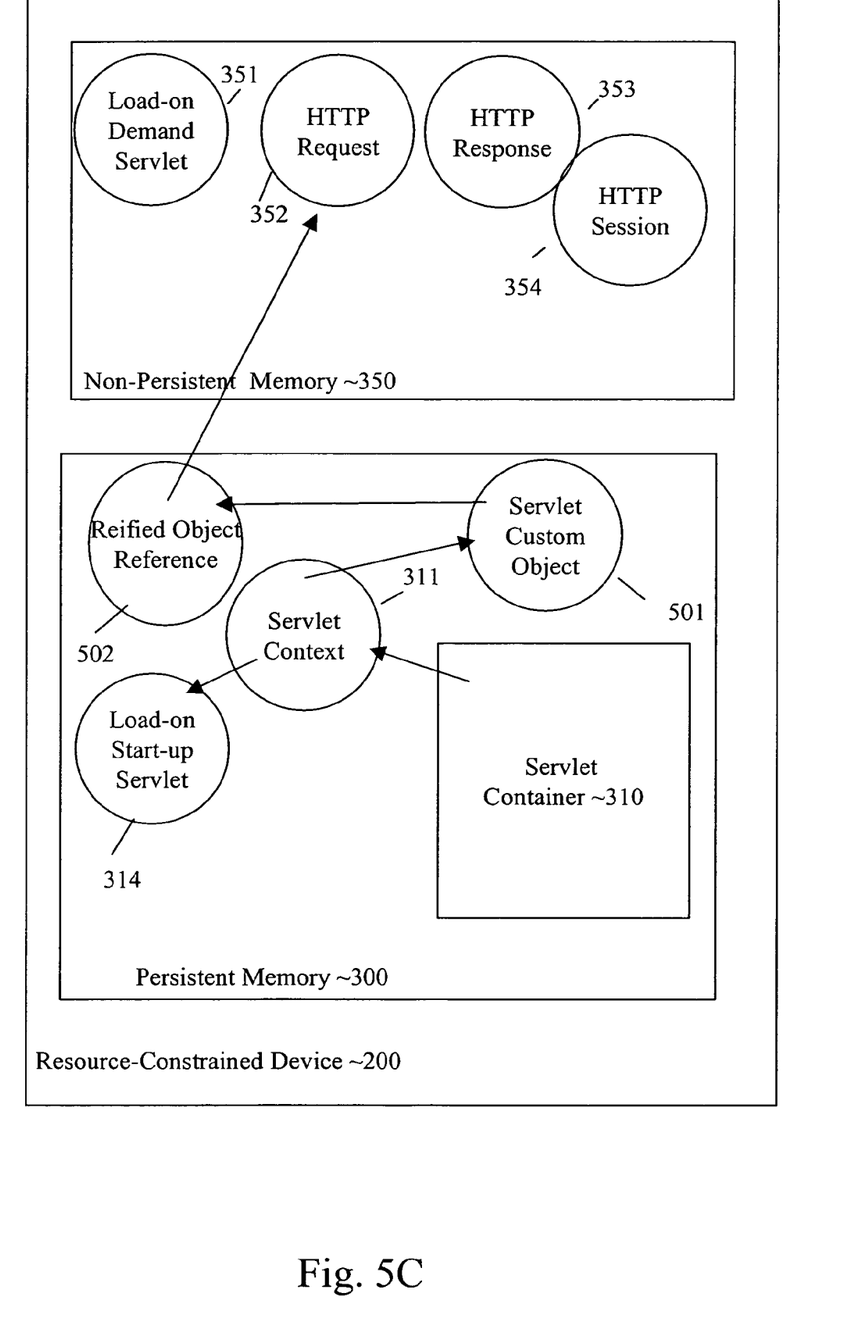

Servlet custom object 501 needs to reference an object in non-persistent memory 350, e.g., HTTP request object 352. However, it is not desired to move HTTP request object 352 to persistent memory 300, which would be done if servlet custom object 501 referenced HTTP request object 352 directly. Instead, servlet custom object 501 stores a reference to a reified object reference 502 (FIG. 5C), and the reference to HTTP request object 352 is in reified object reference 502. Reified object reference 502 is defined and managed so that any internal reference in reified object reference 502 does not force the referenced object into persistent memory 300. Further, the internal reference in reified object reference 502 is valid only during a session. Upon a start of a new session, the reference to reified object reference 502 is still valid since the reified object reference itself is reachable and therefore in persistent memory, but the internal references in reified object reference 502 are invalid until specifically initialized.

Container-Wide Reusable Objects

Some of the container-managed objects mentioned above are both very short-lived and frequently created such as HTTP requests, HTTP responses, and events. On resource-constrained devices, such as device 200, with limited resources, the resulting memory allocation and garbage collection required by these very short-lived and frequently created objects may be the cause of performance problems.

To alleviate the performance issues associated with memory allocation and garbage collection, in one embodiment, reusable object pools, e.g., pool of reusable HTTP request and response objects 600 (FIG. 6), are created in non-persistent memory 350. Assuming that the HTTP request and HTTP response use objects in reusable object pool 600, when a servlet needs a pair of the objects, the objects are allocated from pool 600, used and then returned to pool 600 when not in use anymore. A HTTP request object, for example, is allocated from pool 600, re-initialized and populated with the incoming HTTP request data, then passed to the service method and immediately, and safely, put back in pool 600 after the service method has returned.

Figure 6:
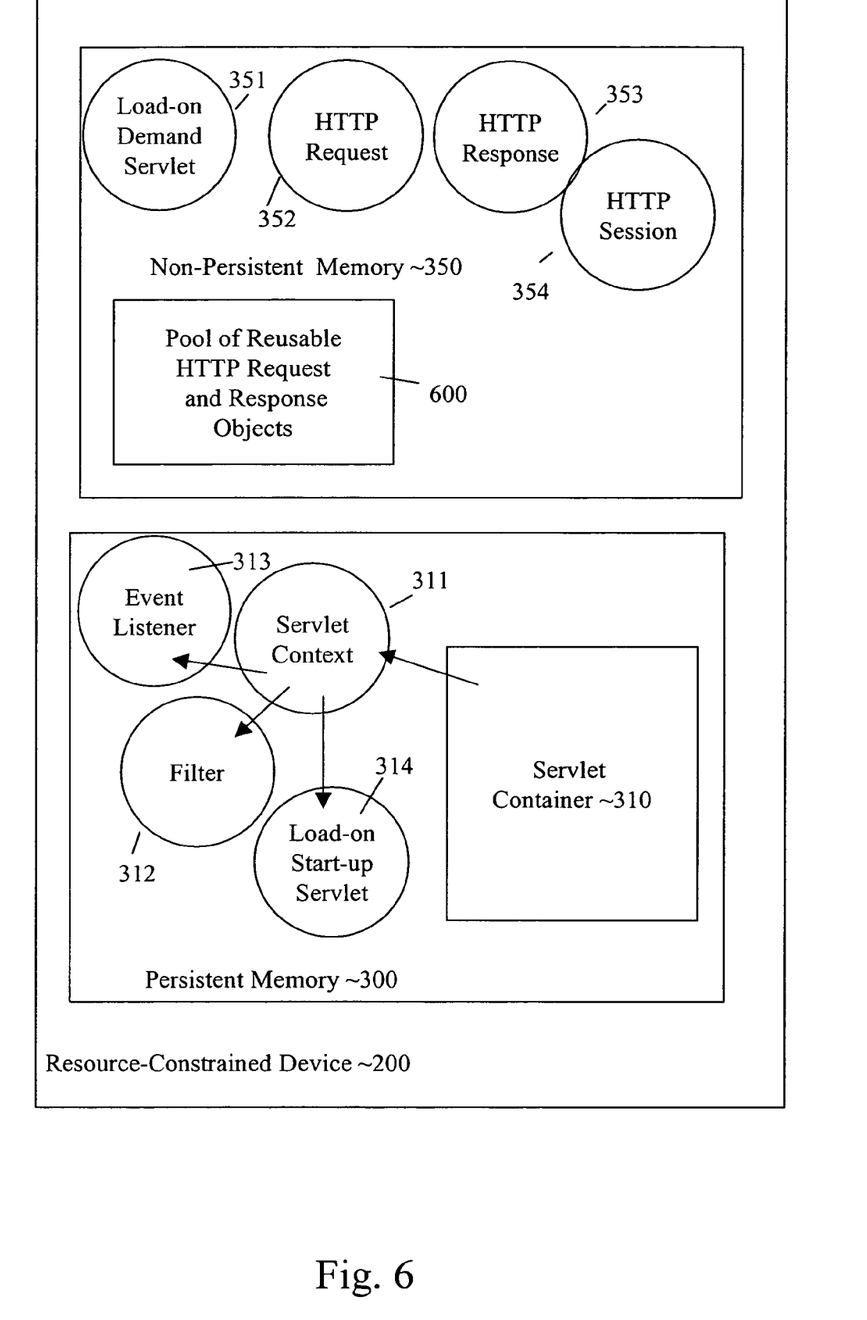
FIG. 6 is an illustration of a resource-constrained-device that includes a pool of objects, in non-persistent memory according to one embodiment of this invention.

While the use of objects from a pool obviates the issues associated with repeated allocation and garbage collection, extreme care must be taken to avoid leaking thru these objects data between unrelated applications. These objects should not only be cleared before being reused, but also, an application should be prevented from keeping any reference to these reusable objects after their standard lifecycle, e.g., a reference to a HTTP request object after the request has been serviced, to avoid applications unlawfully gaining access to data when these objects are reused in a different context. The firewall could typically be in charge of preventing an application from keeping a reference to such objects.

However, if an object in persistent memory points to an object from one of the pools, the pooled object is moved into persistent memory. This complicates re-use of that pooled object. In one embodiment, if this occurs, the pooled object in persistent memory 300 is discarded from the pool. To avoid this problem, the reified object reference discussed above could be used by objects in persistent memory 300 when using an object from a pool so that the object from the pool is not moved into persistent memory 300.

Application-Wide Reusable Objects

A container-wide object reuse policy could put undesired additional burden on the firewall. Another more effective solution is to limit the scope of reuse of such pooled objects to the application itself, i.e., reuse of the objects in a pool is limited to servlets of the same application. Since the reuse would happen within the same isolation context, references to these objects do not need to be protected by the firewall. This approach limits reuse of objects in pools within the same isolation context.

Some of the container-managed objects mentioned above are by default short lived—also referred to as transient. A particular implementation may nevertheless implement reusable object pools in persistent memory and reuse these otherwise transient objects across CAD sessions—hence reducing memory allocation and garbage collection. Note that this can be extended to all transient container-managed objects but it takes its full value with short-lived objects such as events, requests and responses. Nevertheless, as already mentioned, because of the write performance of persistence memory such as EEPROM, reusing persistent objects to avoid creating new objects each time may also have performance degradation instead of gain depending on the frequency of updates. Therefore, an implementor should very carefully evaluate implementing application-wide reusable object pools in non-persistent memory such as RAM and implementing application-wide reusable object pools in persistent memory such as EEPROM.

Thread Persistence

In some embodiments, servlet-based applications are allowed to spawn new application threads, which may stay alive for the application lifetime, i.e., until the application is unloaded. When a normal server goes down, a developer used to developing servlet-based web applications on server platforms typically expects the application to be restarted from scratch. In an environment such as smart cards or other resource-constrained devices, applications may be interrupted at anytime when cards are torn from their card acceptance devices and all the threads created by the applications are then interrupted.

For performance and serviceability reasons, applications are not restarted from scratch on a smart card and relevant application state is maintained in persistent memory to eliminate unnecessary re-initialization or cleanup and achieve optimal readiness. Upon platform reset, the servlet-based application must therefore resume the threads in a way consistent with the application's state.

On a smart card platform, threads cannot be safely resumed from their point of execution at the interruption time. The threads must be restarted. Thus, in one embodiment, the application developer must keep track of all such threads and must instantiate and start new threads for each new session.

To alleviate if not eliminate the need for the developer to account for such situations, in another embodiment, thread persistence is provided. Without this thread persistence, as noted above, a developer would have to explicitly handle platform reset (restart of an application) and would have to recreate and restart threads "manually". The downside to this is not only inconvenience but also potential incorrect behavior or security problems if the developer makes a mistake.

Thread Object Persistence

Persistence of objects is discriminately extended to java.lang.Thread objects so that such threads 701, 702 can be restarted automatically upon restart of the application (i.e. platform reset). In this embodiment, thread objects 701, 702 (FIG. 7) are like any other object persistent by reachability, i.e., threads 701, 702 are reachable via servlet context 311 and so are stored in persistent memory 300. However, execution stacks 703, 704 associated with threads 701, 702, respectively, are not persistent. In this embodiment, a persistent thread, a thread object that is reachable from servlet context 311, is by default automatically restarted at the beginning of method run( ) of the persistent thread.

Figure 7:
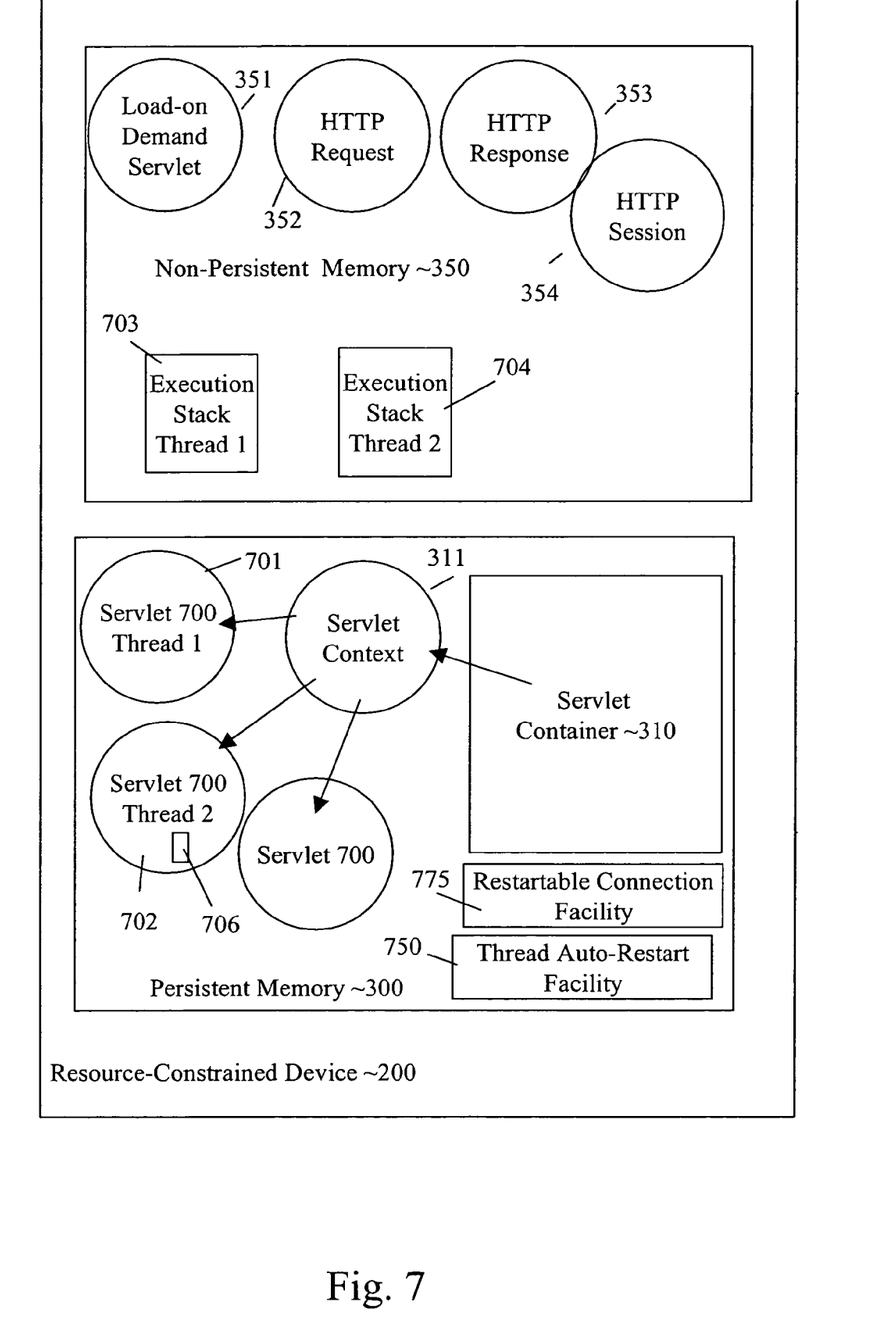
FIG. 7 is an illustration of a resource-constrained device that includes facilities for thread auto-restart and for restartable connections according to one embodiment of the present invention.

This default behavior, i.e., automatic restart, may be configured either globally for all persistent threads via the deployment descriptor, or on a per-thread basis via an application programming interface (API). Default persistent thread restart can be configured in the deployment descriptor. A developer can specify globally if the developer intends threads to be automatically restarted or not. For example, aPersistentThread=new java.lang.Thread( ){public void run( ) { . . . }
};
<JCRE>.restartUponReset (aPersistentThread, true);

A developer can also use an API to alter the default behavior for a particular thread. If a persistent thread is not set to be restarted automatically, the application has to explicitly restart the thread by calling a method start( ).

Since a persistent thread may be automatically restarted in method run( )—that is as if calling method start( )—, threads must be aware that the threads are restarted so that the threads can discriminate between (i) initialization that needs to be done once when initially created and (ii) initialization that must be done each time when restarted (e.g. reset of resources). In one embodiment a flag 706 maintained by thread 702 is used to determine which initialization is required. Flag 702 is also persistent. Thread 702 sets flag 706 the first time thread 702 runs after completing its initialization and tests if flag 706 is already set afterward.

Note that restarting a thread may additionally entail not only resetting the stack of the thread, which typically is kept in volatile memory 350, but also resetting the state of the thread.

Auto-Restart Worker Threads

While the previous embodiment minimizes the effort required by a developer to restart threads for each new session, that embodiment is a change of the java.lang.Thread behavior. An alternative embodiment provides a facility 750, e.g., a factory, to submit tasks that need to run in separate threads and that may be restarted automatically upon platform reset. These tasks implement interface java.lang.Runnable and the facility transparently creates threads to execute them. This facility is in charge of spawning new threads to resume the tasks upon a platform reset if these tasks have been declared as restartable, e.g., aPersistentTask=new java.lang.Runnable( ){public void run( ) { . . . }
};
<JCRE>.runAndRestartUponReset (aPersistentTask);

In this embodiment, pseudo-persistence of threads is provided with the help of a "restartable" thread factory, which re-establishes threads from scratch upon platform reset when needed. Facility 750 is included in persistent management system 200 in one embodiment.

Connection Object Persistence

Resource-constrained device 200 may also support additional facilities derived from the Connected Limited Device Configuration (CLDC) and Mobile Information Device Profile (MIDP) platform such as thread and additional (beyond the sole APDU protocol) input/output (I/O) for both inbound and outbound connections. The Generic Connection Framework (GCF) provides a simplified mechanism for applications to use various types of I/O protocols in resource— constrained environments. I/O is performed by means of connections obtained through a factory class. Connections are dynamically created based on URIs.

Because of nomadic and intermittent nature of operation of resource-constrained device 200, connections are typically session objects. A connection to an external entity cannot be expected to span across sessions.

GCF connection objects, that is instances of classes implementing interface javax.microedition.Connection, which are reachable from the logical persistence root, e.g., servlet context 311, are persistent. However, after a platform reset, such GCF connection objects are in a closed state. Method calls on these GCF connection objects throw exceptions IOException if method close( ) has been previously called.

Note that as for threads, pseudo-persistence of connections could be provided with the help of a "restartable" connection factory 775 which could re-establish connections from scratch upon platform reset when needed. Restartable connection factory 775 is included in persistent management system 200 in one embodiment.

Herein, GCF connection objects are used as an example of connection objects that optionally are restarted upon initiation of a session. In view of this disclosure, those of skill in the art optionally can implement connection objects, for I/O protocols of interest, which are stored in persistent memory and which are restarted upon initiation of a session.

Also, in the above embodiment, a web application and a servlet context were used as a example of an embodiment for selectively moving and/or creating objects in persistent memory that were reachable from the servlet context. In view of this disclosure, those of skill in the art can define a logic root of persistence for applications other than web applications, and for those applications selectively move objects into persistent memory based upon whether the objects are reachable through the logical root of persistence. For example, APDU-based applications and other type of applications can utilize the selective use of persistent memory for objects associated with the applications and the containers in which the applications execute.

In the above description, various features have been considered individually. However, this was for clarity only and was not intended to limit the invention to application of the various features individually. Those of skill in the art appreciate that the features may be used individually or in any desired combination to achieve the desired functionality and performance on a particular resource-constrained device platform.

Those skilled in the art readily recognize that in this embodiment the various embodiment mentioned before in connection with persistent management system 210 are performed by executing computer program instructions on a processor (not shown) of resource-constrained device 200. In one embodiment, a storage medium (not shown) has thereon installed computer-readable program code for system 200, and execution of the computer-readable program code causes the processor of resource-constrained device 200 to perform the various functions explained above.

Herein, a computer program product comprises a medium configured to store computer readable code for any one of, or any combination of persistent management system 200, creation and use of object pools, thread-auto-restart facility 750 and restartable connection facility 775, or in which computer readable code for any one of, or any combination of persistent management system 200, creation and use of object pools, thread-auto-restart facility 750 and restartable connection facility 775, is stored. Some examples of non-transitory computer program products are DVD discs, CD-ROM discs, ROM cards, floppy discs, magnetic tapes, computer hard drives, servers on a network.

Another embodiment of the present invention also relates to a method for using resource-constrained device 200 for carrying out the functions of any one of, or any combination of persistent management system 200, creation and use of object pools, thread-auto-restart facility 750 and restartable connection facility 775. Still another embodiment of the present invention relates to a computer system with a storage medium on which a computer program for carrying out the functions of any one of, or any combination of persistent management system 200, creation and use of object pools, thread-auto-restart facility 750 and restartable connection facility 775, is stored.

We claim:

1. A method implemented on a resource-constrained device to ensure persistence across card acceptance device sessions, the method comprising:
    creating a logical persistence root for objects associated with an application being started for execution on a resource-constrained device,
        wherein the logic persistence root comprises a servlet context, wherein the logical persistence root is stored in a persistent memory of the resource constrained device; and
wherein said objects are instantiations of at least one object-oriented class;
instantiating and storing, upon startup of the application, objects associated with the application in the persistence memory,
wherein the objects associated with the application include any one of or any combination of a filter, an event listener, and a load-on-start-up servlet,
wherein the objects associated with the application are reachable directly or indirectly through the servlet context,
wherein an object is reachable directly through the servlet context if a reference is made to that object through the servlet context, and
wherein an object is indirectly reachable through the servlet context if the object is referenced by an object that is reachable directly through the servlet context;
moving other objects associated with the application, which are in a non-persistent memory of the resource constrained device and which are reachable directly or indirectly from the logical persistence root, from the non-persistent memory to the persistent memory,
wherein an object in the non-persistent memory is reachable directly from the logical persistence root if a reference is made to that object from any one of the objects associated with the application stored in the persistent memory, and
wherein an object in the non-persistent memory is indirectly reachable from the logical persistence root if the object is referenced by an object that is reachable directly from the logic persistence root; and
storing each object of said objects reachable directly or indirectly from said logical persistence root in the persistent memory in said resource-constrained device,
wherein said each object stored in said persistent memory is persistent across the sessions until said application is unloaded and further wherein a session is started on insertion of said resource-constrained device in a card acceptance device and said session is terminated upon removal of said resource-constrained device from said card acceptance device.

2. The method of claim 1 further comprising:
storing a second object, referenced from a first object stored in said persistent memory, in said persistent memory wherein said first object is reachable from said logical persistence root.

3. The method of claim 1 further comprising:
storing objects not reachable from said logical persistent root in a non-persistent memory in said resource-constrained device wherein said non-persistent memory is reset upon said start of said session.

4. The method of claim 1 wherein said objects stored in said persistent memory further include any one of or any combination of a persistent thread, and a persistent GCF connection.

5. The method of claim 1 further comprising:
using an object from a pool of objects stored in a non-persistent memory.

6. The method of claim 5 wherein said using is limited to servlets of a same application.

7. The method of claim 1 further comprising:
using an object from a pool of objects stored in said persistent memory.

8. The method of claim 1 further comprising:
automatically restarting a thread upon start of another session different from said session.

9. The method of claim 1 further comprising:
maintaining a connection object across said sessions.

10. The method of claim 1 further comprising:
using a reified object reference, reachable from said logical persistence root, to reference an object in non-persistent memory so that said object is not moved to said persistence memory.

11. A resource-constrained device comprising:
a persistent memory of the resource constrained device having stored therein a logical root of persistence wherein the logical root of persistence comprises a servlet context;
a non-persistent memory of the resource constrained device; and
a persistent management system on the resource constrained device, wherein said persistent management system:
(i) stores, upon startup of an application and instantiation of objects associated with the application, the objects associated with the application in the persistence memory,
wherein the objects associated with the application include any one of or any combination of a filter, an event listener, and a load-on-start-up servlet,
wherein the objects associated with the application are reachable directly or indirectly through the servlet context,
wherein an object is reachable directly through the servlet context if a reference is made to that object through the servlet context, and
wherein an object is indirectly reachable through the servlet context if the object is referenced by an object that is reachable directly through the servlet context;
(ii) moves an object from said non-persistent memory to said persistent memory when said object is referenced directly or indirectly from said logical root of persistence,
wherein an object in the non-persistent memory is reachable directly from the logical root of persistence if a reference is made to that object from any one of the objects associated with the application stored in the persistent memory, and
wherein an object in the non-persistent memory is indirectly reachable from the logical root of persistence if the object is referenced by an object that is reachable directly from the logic persistence root, and
(iii) stores the object in the persistent memory,
wherein said each object stored in said persistent memory is persistent across the sessions until said application is unloaded and further wherein a session is started on insertion of said resource-constrained device in a card acceptance device and said session is terminated upon removal of said resource-constrained device from said card acceptance device.

12. The resource-constrained device of claim 11 further comprising:
a pool of objects stored in said non-persistent memory.

13. The resource-constrained device of claim 11 further comprising:
a facility for automatically restarting a thread upon start of a new session for said resource-constrained device, wherein said new session is started on insertion of said resource-constrained device in a card acceptance device and said new session is terminated upon removal of said resource-constrained device from said card acceptance device.

14. A non-transitory computer product having embedded therein computer-readable instructions for a persistence management system wherein upon execution of said computer-readable instructions on a resource-constrained device results in a method implemented on the resource-constrained device to ensure persistence across card acceptance device sessions, the method comprising:

creating a logical persistence root for objects associated with an application being started for execution on a resource-constrained device,
wherein the logic persistence root comprises a servlet context,
wherein the logical persistence root is stored in a persistent memory of the resource constrained device; and
wherein said objects are instantiations of at least one object-oriented class;

instantiating and storing, upon startup of the application, objects associated with the application in the persistence memory,
wherein the objects associated with the application include any one of or any combination of a filter, an event listener, and a load-on-start-up servlet
wherein the objects associated with the application are reachable directly or indirectly through the servlet context,
wherein an object is reachable directly through the servlet context if a reference is made to that object through the servlet context, and
wherein an object is indirectly reachable through the servlet context if the object is referenced by an object that is reachable directly through the servlet context;

moving other objects associated with the application, which are in a non-persistent memory of the resource constrained device and which are reachable directly or indirectly from the logical persistence root, from the non-persistent memory to the persistent memory,
wherein an object in the non-persistent memory is reachable directly from the logical persistence root if a reference is made to that object from any one of the objects associated with the application stored in the persistent memory, and
wherein an object in the non-persistent memory is indirectly reachable from the logical persistence root if the object is referenced by an object that is reachable directly from the logic persistence root; and storing each object of said objects reachable directly or indirectly from said logical persistence root in the persistent memory in said resource-constrained device,
wherein said each object stored in said persistent memory is persistent across the sessions until said application is unloaded and further wherein a session is started on insertion of said resource-constrained device in a card acceptance device and said session is terminated upon removal of said resource-constrained device from said card acceptance device.

15. The non-transitory computer product of claim 14 wherein said method further comprises:
storing objects not reachable from said logical persistent root in a non-persistent memory in said resource-constrained device wherein said non-persistent memory is reset upon said start of said session.

16. The non-transitory computer product of claim 14 wherein said objects stored in said persistent memory further includes any one of or any combination of a persistent thread, and a persistent Generic Connection Framework connection.

17. The non-transitory computer product of claim 14 wherein said method further comprises:
using an object from a pool of objects in a non-persistent memory.

18. The non-transitory computer product of claim 14 wherein said method further comprises:
automatically restarting a thread upon start of another session different from said session.

19. The non-transitory computer product of claim 14 wherein said method further comprises:
maintaining a connection object across said sessions.

* * * * *